Aug. 15, 1967

M. L. DICK 3,335,975

SAFETY DEVICE

Filed Nov. 9, 1965

MELVIN L. DICK
INVENTOR.

BY Charles T. Woodward
ATTORNEY

Aug. 15, 1967  M. L. DICK  3,335,975
SAFETY DEVICE

Filed Nov. 9, 1965  3 Sheets-Sheet 2

MELVIN L. DICK
INVENTOR.

BY
ATTORNEY

Aug. 15, 1967  M. L. DICK  3,335,975
SAFETY DEVICE
Filed Nov. 9, 1965  3 Sheets-Sheet 3
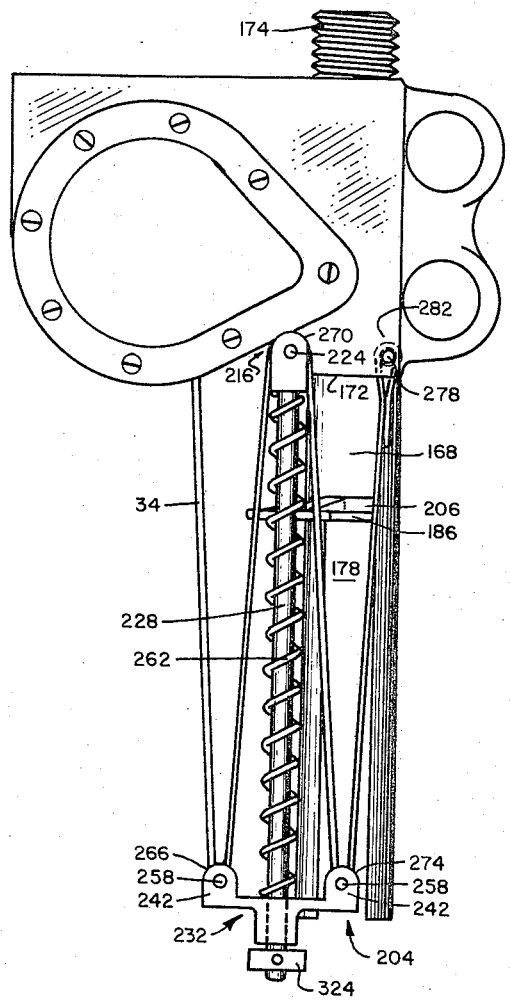
MELVIN L. DICK
INVENTOR.
BY
ATTORNEY United States Patent Office 3,335,975
Patented Aug. 15, 1967

3,335,975
SAFETY DEVICE
Melvin L. Dick, Fort Worth, Tex., assignor to General Dynamics Corporation, Fort Worth, Tex., a corporation of Delaware
Filed Nov. 9, 1965, Ser. No. 506,966
6 Claims. (Cl. 242—107.4)

ABSTRACT OF THE DISCLOSURE

A safety device for restraining a seat occupant having coaxial independent main shafts receiving shoulder harness straps, spring actuated take-up reels, and a centrifugal actuator which increases in diameter at a given centrifugal force, initiating a solenoid which acts on a secondary shaft, causing the secondary shaft to rotate and carry with it a pawl locking member which engages a locking gear on the main shaft to prevent further rotation until released. Provision is also made for ballistic retraction of the straps through a piston and collar, slidable within a ballistic cylinder, the collar engaging carriage members so as to force them downwardly on actuation of the ballistic means, and thus causing the harness straps to be taken up. The carriage members are biased toward the extended position by springs. The assembly locks in the take-up position on ballistic retraction, and may be unlocked to return to its normal extended position.

The present invention relates generally to safety apparatus operable to restrain and confine a human being within a seat.

More specifically, the preferred embodiment of the invention relates to an apparatus particularly suited for employment in conjunction with seats of the type which may be ejected from rapidly moving vehicles, while permissive of substantial freedom of movement for the occupant prior to ejection. The movement is achieved through independent operation of portions of the restraining device prior to the application of excessive forces to the occupant. When his acceleration either exceeds preestablished levels or varies to the directional movement of the seat, the device of the invention prevents his further movement relative to the seat, and during ejection positively draws him into a posture in juxtaposition to the seat which affords the optimum anatomical support during the extreme acceleration resulting from ejection.

All military aircraft employ a means of permitting escape from the aircraft. These means may be an open ejection seat or an automatic, self-closing capsule. Regardless of the means employed, some method of restraining the occupant in the seat is a prerequisite to safe ejection. This means is normally afforded by a standard military shoulder harness passing around the shoulders and the hip.

The present invention, for the sake of simplicity hereafter referred to as an inertia reel assembly, is operative in conjunction with such harness, and receives one extremity of the harness shoulder straps in such manner as to cause the straps to be independently coilable on independent spools within the reel. In this manner, the occupant may individually move each shoulder away from the seat, while the other shoulder and hips are maintained in a restrained position by the remainder of the harness. Such permissive movement obviously allows the occupant maximum flexibility, giving him an ability to perform necessary tasks while still confined and restrained otherwise by the safety harness. This movement of one shoulder relative to the other promotes comfort and ease of movement to the wearer and in addition greatly augments his efficiency and performance. However, the application of a force in excess of a given $g$ load resultant from the forced relative movement of the occupant in relation to the seat, carries forward the shoulder harness which causes abrupt rotation of the spools upon which the shoulder straps are wound. This sudden acceleration of the spools initiates locking of the spools, thus automatically restraining the occupant from any further or subsequent forward movement, thus preventing collision with objects within the space occupied. If for any reason the loads should be relieved momentarily allowing the occupant to be returned to a position closer to the seat the inertia reel locking mechanism will ratchet, thus permitting the slack in such shoulder straps to be rewound, without allowing any extension of such straps upon reapplication of the loads, i.e., following locking, any movement toward the seat causes the locking means to ratchet, thus the device permits rearward motion but prevents forward motion.

Additionally, the inertia reel of the present invention is operable to immediately and automatically rewind the shoulder straps of the harness as a sequence of ejection.

There are presently a number of inertia reels commercially available, but each has deficiencies which are obviated by the device of the present invention. Among the most serious of these defects is that great difficulty has been encountered with the reliability of these devices. Further deleterious inherent characteristics are hereinafter described.

In many of the present inertia reels, both shoulder straps are attached at a single point to a cable which is subsequently wound upon a single reel. This method is acceptable only if the occupant leans straight forward, since, if the motion is to reach forward and across, one shoulder strap becomes slack and loose due to the single point attachment. Many state-of-the-art units depend upon the inertia of the operating mechanism to lock the device, i.e., as force is applied to the straps, the device resists rotation of its single spool through engagement with a flywheel. The inertia of the flywheel causes the force exerted to pull the winding mechanism up within the housing instead of causing the straps to unwind. As the operating mechanism swings up within its associated housing, the reel engages a suitable locking member. This action is dependent upon the inertia of the operating mechanism, the resistance of the mechanism to quick rotation, the weight of the members to be raised and the force applied. It is obvious that with all the variables with are material factors in its operation, great difficulty and many adjustments are required to make these devices operate within the rigid operational boundaries required to insure the occupant's safety.

In addition, state-of-the-art reels weight is approximately six pounds and comprise a very large number of operating parts. The number of parts and their "watch like" characteristics engenders a serious and continuing maintenance problem to the reel, requiring numerous time consuming adjustments and constant maintenance by "experts." As in any such precision device having many parts, reliability is adversely affected, and production and maintenance are both costly and complicated. Obviously, because of the radial motion engendered, the shoulder strap spools require guides in the housing to insure proper winding. In addition, the device must be rotated to cause locking and employs a separate retraction mechanism for use during ejection, which mechanism is normally affixed to the top of the basic inertia unit, thus increasing the bulk and weight of the unit and restricting the space requirements. Furthermore, such retraction mechanisms employ a driven nut type of system which, due to its great friction, requires very large explosive activation charges (approx. 6000 p.s.i.) behind the occupant's head.

The inertia reel of the present invention overcomes the deleterious characteristics of the prior art through simplicity of design and mechanism. This novel mechanism has fewer parts, is substantially lighter, and is of a design which enhances reliability as compared to present devices. The reel requires only an initial adjustment and minimal maintenance. However, if a reel is damaged and maintenance is required, repairs can normally be accomplished in the field by personnel other than factory trained specialists. The present invention does not require shoulder strap spool guides, since it employs spools located upon the primary shafts. The retraction unit may be an integral portion of the reel and employs a free piston for power retraction, thus requiring only a minimal charge of (approximately 500 p.s.i.). As this unit is lighter, has significantly less working parts and is simple in design, manufacturing costs are considerably less than reels of the prior art.

An object of the present invention is to provide an inertia reel which allows the shoulder straps of a typical aircraft type harness to be extended individually, thus permitting the wearer to move his shoulder freely, and promoting heretofore unachievable flexibility which augments efficiency at performing assigned tasks. An additional object is the provision of a greatly simplified lightweight rugged mechanism with a minimum of working parts.

Other objects and many attendants advantages of this invention will become readily apparent to those skilled in the art from a consideration of the following description, drawings and appended claims. It should be noted that the terms and expressions employed herein are terms of description and not limitation.

Referring now to the drawings, in general:

FIGURE 4 is an end elevation of the present invention showing the path of the take-up strap and travel of the spring of the spring guide carriage;

Figure 1:
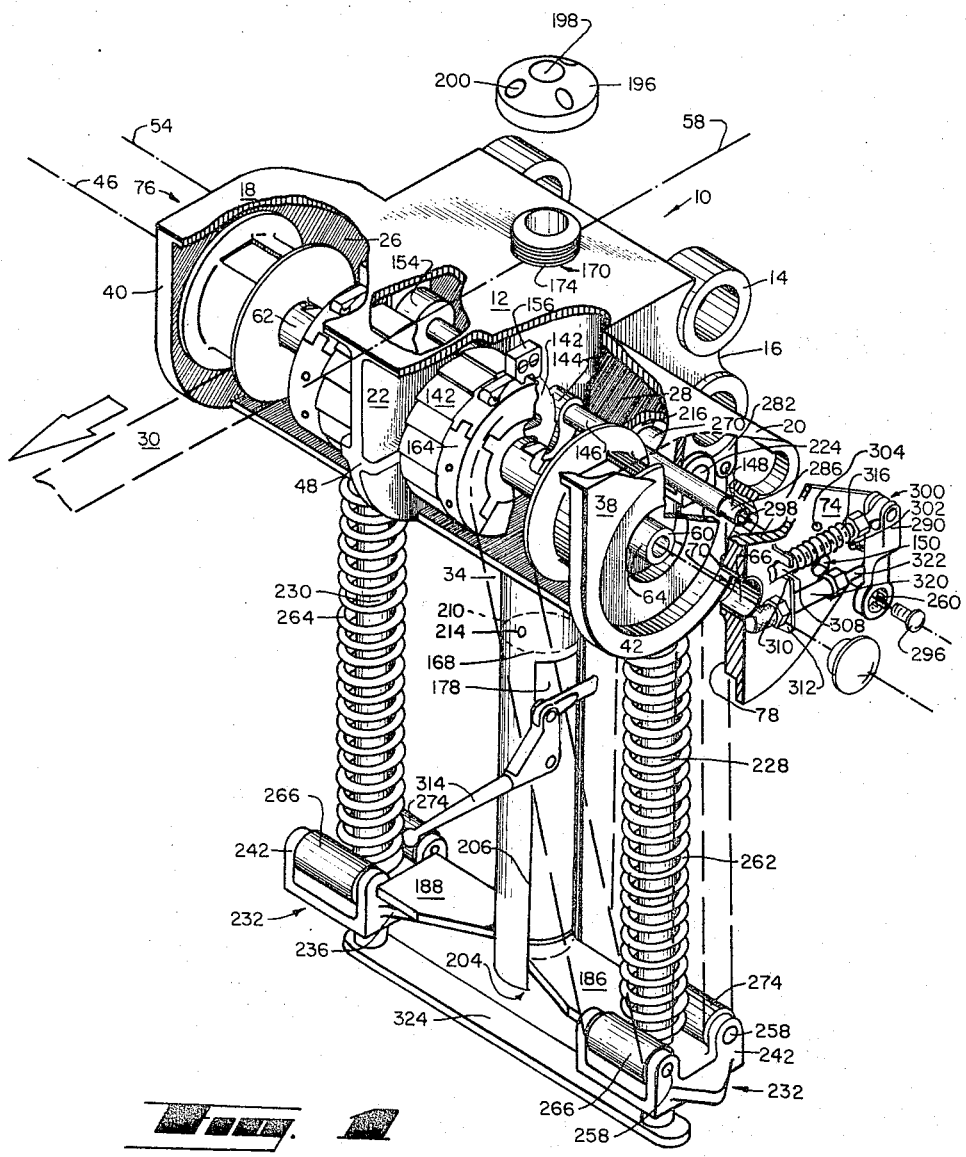
FIGURE 1 is an isometric, cut-away veiw of the present invention.

The device of the present invention and the physical relationship of the individual components is, in general, revealed in FIGURE 1 and is shown to comprise a housing member 10 which may be cast from a suitable material such as aluminum or magnesium, in a configuration which compactly receives and provides structural support and integrity to the operating members. Housing member 10 is cast into a shape comprising a substantially square center portion 12 having integral annular mounting lugs 14 upon back portion 16 thereof. Center portion 12 further consists of two diametrically opposed integral extensions 18 and 20 on either side thereof, each having an elongated semicircular cross-section. Center portion 12 may have an integral structural partition 22 vertically located in the center of housing 10 and perpendicular to extensions 18 and 20. Partition 22 may also have vertical and horizontal bossed intersecting reinforcements 48 on either side thereof. Structural partition 22 extends from a front portion or plate (not shown) to back plate 16, dividing housing 10 into compartments 26 and 28. The front plate is open to permit ease of maintenance and allow shoulder straps 30 and 32 (only one of which is illustrated) and take-up straps 34 and 36 (only one of which is illustrated) to have unrestricted movement into and out of the housing. Housing 10 incorporates integral end members 38 and 40 in extensions 18 and 20. The end members have large apertures therein, as seen at 42 in end 38, the geometric center of which is located along axial base line 46. Axial base line 46 is perpendicular to structural partition 22 and extends therethrough at the intersection of bossed reinforcement 48. Further, end member 38 has, in addition to the large aperture 42, a small aperture (not shown), which is centered on secondary axial base line 54 which is perpendicular to partition 22 and extends through housing 10 parallel to axial base line 46.

All members of housing 10 may be suitably filleted where applicable to provide additional structural integrity.

Housing 10 rotatably supports two independent coaxial primary shafts 60 and 62, the center lines of which coincide with axial base line 46. Primary shafts 60 and 62 employ journals 64 upon either end thereof, which journals are rotatably received and supported within sleeve type bearings 66. Sleeve bearings 66 are, in the preferred embodiment, of polytetrafluoroethylene material. Bearing 66 may be press fitted into a suitable aperture 70 located in the appropriate plate or end cap 74, 76. The geometric center of the bearing is located upon axial base line 46. The center bearing 66 in plate 22 is of sufficient length to rotatably support and receive two journals 64, one on each inner extremity of the primary shafts 60 and 62, thereby permitting the shafts to abut one another within the bearing. The remaining journals 64 on the opposite outboard extremities of the shafts are received within bearings 66 and may be attached as above noted. Housing 10 depends on end caps 74 and 76 to provide adequate independent suspension for both primary shafts along axial base line 46. End caps 74 and 76 receive the bearings and are so cast as to be of a configuration commensurate with extensions 18 and 20 of housing 10. Proper alignment of the end caps, outboard bearings 66, housing 10 and center bearing 66 is insured by integral protuberances 78 which are received within apertures 42. End caps 74 and 76 may be attached to housing 10 by bolts, screws or other suitable means.

This type of construction, i.e., the housing end cap relationship, is provided to permit insertion and withdrawal of primary shafts 60, 62 and their associated mechanisms through large apertures 42 in integral end members 38 and 40 while simultaneously providing suitable support for the outer extremities of the shafts.

Both primary shafts, hereinafter described, are identical and each rotatably supports a locking gear, an inertial actuating mechanism, and a shoulder strap spool with sufficient space provided on the shaft between the shoulder strap spool and inertial actuating mechanism for storage of the take-up straps.

In that both shafts and their associated mechanisms are identical, only one will be described in detail.

Figures 2, 3, 5:
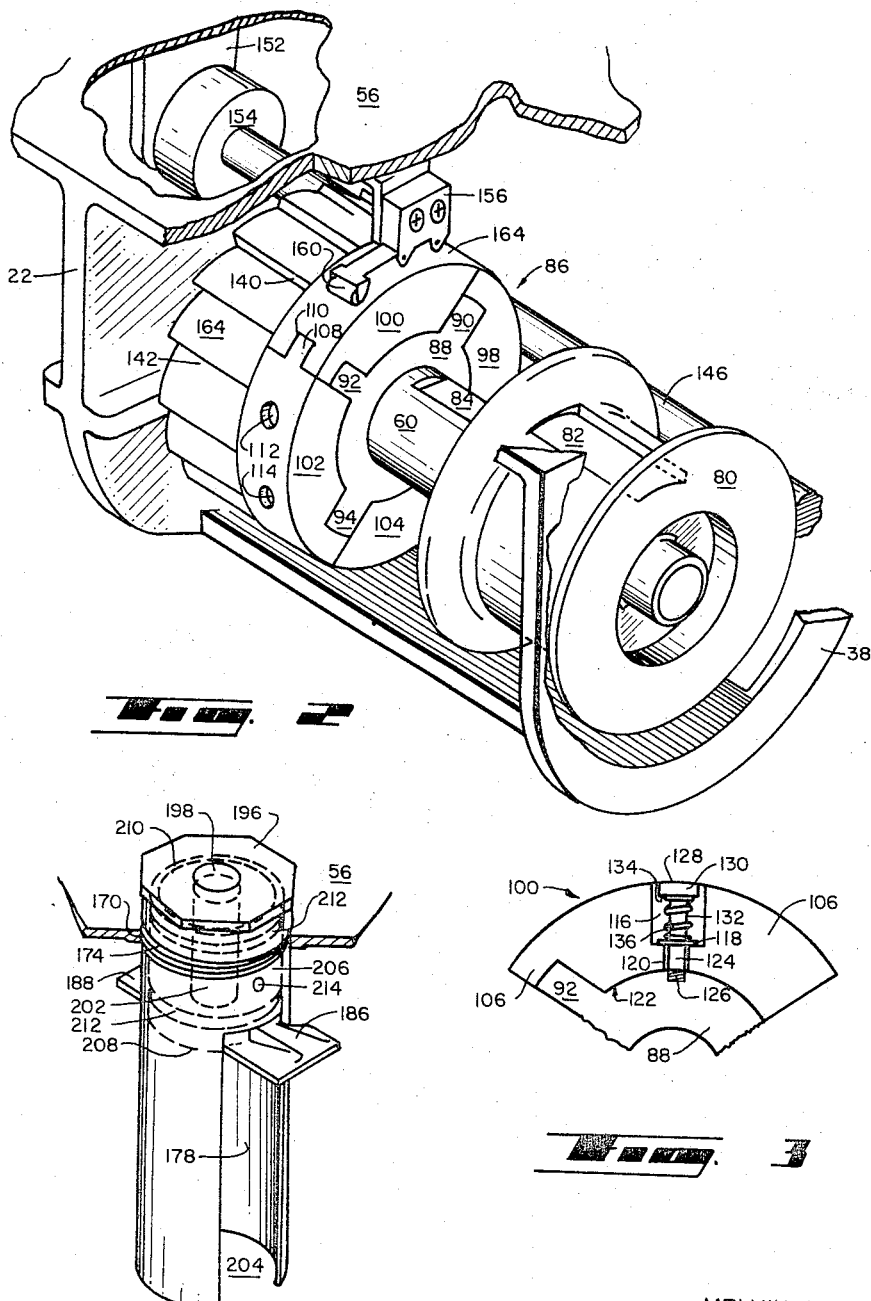
FIGURE 2 is a detail isometric view of the inertial locking member of the invention.
FIGURE 3 is a sectional elevation of the guide elements in the inertial weight.
FIGURE 5 is an isometric view of the retraction assembly of the invention showing the piston-cylinder arrangement.

Referring now to FIGURE 2, primary shaft 60 rotatably supports at its extremity adjacent to end member 38 shoulder strap spool 80 having indented portion 82 therein for attachment of shoulder strap 30, which may be accomplished by screw, clips or any other suitable method. Spool 80 has an aperture (not shown) in the center thereof to permit its installation upon primary shaft 60. Relative rotational movement of spool 80 and primary shaft 60 is prevented by employment of a splined fitting (not shown) between shaft 60 and shoulder strap spool 80. Relative lateral movement is prevented by expandable split rings (not shown) in annular grooves in shaft 60 immediately adjacent to either side of the spool.

Adjacent to spool 80 on the side opposite end member 38, shaft 60 has an indentation 84 therein similar to indented portion 82 of spool 80. Indentation 84 receives one extremity of take-up strap 34. Space is provided on shaft 60 to permit storage of take-up strap 34 thereon.

Adjacent to indentation 84 on the side thereof furthest removed from shoulder strap spool 80 is positioned centrifugal actuating mechanism 86. Centrifugal actuating mechanism 86 is comprised of spider 88 which is received upon shaft 60. Spider 88 has four perpendicular integral guide appendages 90, 92, 94 and 96 equidistantly spaced about its circumference, and resting upon the circumference thereof, between and over the integral guide appendages, four inertial weights 98, 100, 102, and 104. These weights are semicircular in configuration, and are in an association with the spider which gives a circular profile to centrifugal actuating mechanism 86.

Each inertial weight has an integral section 106 which extends over the associated guide appendage and has thin guide extension 108 which lies within the circumferential plane of the mechanism. Guide extension 108 is loosely received within recess 110 in the weight adjacent to integral section 106 to thereby insure proper alignment of the weights. Spider 88 is of a width slightly greater than the associated weights to prevent inadvertent contact of strap 34 with the inertial weights to prevent restricting or impeding their reaction to centrifugal force.

Each weight further incorporates two guide apertures 112 and 114 therewithin, the apertures comprising two coaxial bores as best illustrated in FIGURE 3, which shows one such bore in detail. A first bore 116 extends approximately three quarters of the depth of the weight, at which point it forms an annular shoulder 118 and adjoins smaller diameter bore 120, coaxial therewith, which extends through to the inner surface 122 of the weight, which is immediately adjacent to spider 88. Bores 116 and 120 each loosely receive machine screws 124 which extend through the inertial weight and are threadably received in recess 126 in spider 88. Outer surface 128 of head portion 130 is flush with the circumference of the centrifugal actuating mechanism while the weights are static. However, upon rotation of the mechanism and the subsequent application of centrifugal force, the weights travel outward along shanks 132 of screw 124 until the inner surface 134 of screw head 130 engages annular shoulder 118, thus preventing further travel. The weights are restrained in the static position by calibrated resilient retaining springs 136 which are received upon shanks 132 between annular shoulder 118 and surfaces 134 of machine screw head portion 130. Each spring is selected to prevent movement of the weight until a centrifugal force of one g is encountered. In that there are two such retaining springs per weight, a force of 2 g's will be resisted by springs 136 and the weights will remain static. Upon approaching two and one half to three g's, the retaining resiliency of springs 136 is exceeded, permitting the weights to move away from spider 88, thus increasing the diameter of inertial actuating mechanism 86.

In addition, a ratchet locking gear 142, as best shown in FIGURE 1, is positioned on primary shaft 60 between inertial actuating mechanism 86 and integral structural partition 22. Rotational and lateral movement thereof relative to such shaft is prevented by a spline and spline socket relationship in the manner previously described. Locking gear 142, see also FIGURE 2, in the preferred embodiment, is approximately two inches in diameter and has a three quarter inch face and sixteen, one eighth inch deep teeth 140 in a five sixteenth inch rim. Gear 142 employs a central hub and four spoke design to reduce weight, and operates in conjunction with and is engaged by a pawl 144 which is received upon a secondary shaft 146 in housing 10. Secondary shaft 146 is rotatably supported by housing 10 and is located behind primary shafts 60 and 62 on secondary axial base line 54. As best seen in FIGURE 1, secondary shaft 146 has journals 148 on both extremities which are received in sleeve type bearings 150. Secondary shaft 146 extends from bearing 150 in end cap 74 through an aperture (not shown) in end member 38 along secondary axial base line 54. The shaft further extends through an aperture (not visible) in partition 22 to integral structural mounting lug 152 which lies in base line 54 and extends from the underside of roof 56 in compartment 28. Secondary shaft 146 is rotatably received in sleeve bearing 150 in mounting lug 152.

It is noted that only one primary shaft and its associated components are described above in the interest of brevity. As indicated supra, however, there are two such primary shafts, hence, two inertial actuating mechanisms, two ratchet locking gears, and two shoulder strap spools, one set in each compartment. Secondary shaft 146 has mounted thereon, in a spline and spline socket relationship, two pawls so positioned as to permit them to individually engage the ratchet locking gears 142 and rotary solenoid 154.

One pawl 144 is described above and is located in compartment 26 and engages locking gear 142. The other pawl is identical to the one described and is in compartment 28 and engages a ratchet locking gear identical to gear 142 previously described. Rotary solenoid 154 is on the extremity of secondary shaft 146 adjacent to mounting lug 152.

Referring again to FIGURE 2, the inertial actuating mechanisms 86 have in close proximity thereto and adjacent to their circumference microswitches 156. These microswitches are firmly attached to roof 56 of housing 10 by any suitable method in a location which permits the proximity required. Both microswitches 156 incorporate a cam follower 160 which rides upon outer surfaces 164 of inertial actuating mechanism 86. Therefore, any increase in diameter of the inertial actuating mechanism by outward movement of weights 98–104 results in a corresponding movement of cam followers 160, thus activating the microswitches and energizing rotary solenoid 154, which turns secondary shaft 146 resulting in engagement of pawls 144 (FIGURE 1) with their corresponding locking gears 142.

Referring now to FIGURES 1 and 4, it is seen that housing 10 has, extending through a portion thereof, ballistics retraction cylinder 168 constructed, in the preferred embodiment, of extruded aluminum tubing having a .065" to .070" wall thickness capable of withstanding pressures and heat generated by a low pressure explosive. Ballistics retraction cylinder 168 is vertically positioned through housing 10 along longitudinal centerline 58 adjacent to the internal edge of partition 22. Cylinder 168 extends through floor 172 of center portion 12 and is received within a threaded aperture 170 in portion 56 of housing 10, extending to a point just above roof 56. The cylinder has threads 174 on the outer surface thereof at a position which corresponds to the threads in aperture 170 when the cylinder is in place. Threads 174 also receive an internal lock nut (not illustrated) thereon to secure the cylinder and prevent its movement due to vibratory loading. Cylinder 168 extends below housing 10 and has large diametrically opposing vertical slots 178 therein. These slots are cut from a point slightly below housing 10 to the lower extremity of cylinder 168.

The upper extremity of ballistics retraction cylinder 168, which extends beyond roof 56 of housing 10, is partially threaded and receives cylinder head 196 having corresponding threads therein. Cylinder head 196 encompasses two threaded apertures 198 and 200 therein. Aperture 198 receives threaded portion of sized explosive charge or squib 202 (illustrated in phantom FIGURE 5) which hangs within cylinder 168. Remaining aperture 200 may be utilized for introducing gases within cylinder 168 for testing purposes and is normally capped.

Ballistics retraction cylinder 168 further receives in its inner bore 204 piston assembly 206, illustrated in FIGURES 4 and 5. Piston assembly 206 comprises piston head 208 and integral tubular piston skirt 210. Further, piston assembly 206 possesses diametrically opposing flanges 186 and 188 thereon at the extremity, forming piston head 208. Flanges 186 and 188 are received in vertical slots 178. Piston assembly 206 normally is static and is positioned in cylinder 168 adjacent to squib 202 and having the squib encompassed by tubular integral piston skirt 210 which extends to a point adjacent to cylinder head 196. Piston skirt 210 which is of a length in relation to cylinder 168 which permitss piston assembly 206 to reach the bottom of its stroke without uncovering the vertical slots 178 in cylinder 168, and piston head 208 are of a diameter which permits piston assembly 206 and flanges 186 and 188 to be easily driven down bore 204 and into contact with the hereinafter described spring retaining carriages. Piston skirt 210 receives therein a suitable piston ring 212 which exerts sufficient force against the wall of the inner bore 204 to retain piston assembly 206 in the upper static position until ignition of squib 202. Further, ring 212 precludes blowby of expanding gases, thus augmenting the efficiency of squib 202 and piston assembly 206. Cylinder 168 has in the wall thereof suitable sized weep hole 214 to allow graduated bleed-off of expanded gases after the piston assembly has reached the lower extremities of its stroke.

Piston assembly 206 is driven by gases generated by squib 202, down inner bore 204 until flanges 186 and 188 strike suitable carriages, forcing the carriage down until their limit of travel is reached.

Housing 10 has on the lower surface thereof two pairs of integral mounting lugs 216. These lugs have apertures which receive suitable retainer pins 224 and are located in a spaced relationship with and upon diametrically opposing sides of ballistics retraction cylinder 168 in alignment with indention 84 in primary shaft 60 which receives take-up strap 34. Each pair of lugs cooperates with a clevis attached to spring guides 228 and 230. Guides 228 and 230 are suspended from retaining pins 224 through lugs 216 and their associated clevis.

Spring guides 228 and 230 are attached to either side of cylinder 168 and are suitably connected at their lower extremities by tie rod 324. Further, each slideably receives spring retaining carriages 232. Such guides are received by bossed apertures in carriages 232. Each has an integral protuberance 236 upon the side adjacent to cylinder 168 which permits their engagement with the lower surfaces of flanges 186 and 188. In addition to protuberances 236, each carriage has four vertical integral lugs 242 on the upper surface thereof, which have suitable apertures therein to permit shafts 258 to be rotatably suspended between opposing lugs. Shafts 258 each support suitable take-up strap rollers 266 which rotatably receive and guide take-up straps 34.

Two resilient springs 262 and 264 are positioned over spring guides 228 between the clevises at the upper extremity of each guide and spring retaining carriage.

Referring now to FIGURE 4, take-up straps 34 extend from indentations 84 in shafts 60 and 62 respectively under take-up rollers 266, up and over rollers 270 between lugs 216. From that point both straps extend downward to and under take-up strap rollers 274 where they again change direction and are subsequently affixed and their extremities to pins 278 in their associated mounting 282 in housing 10.

From the above, it is apparent that rotation of either or both primary shafts 60 results in winding take-up straps 34 over their rollers, thus shortening the straps separately or together. As one extremity is anchored to pins 278, carriages 232 are subsequently lifted up spring guides 228 against the bias load applied by springs 262.

Referring now to FIGURE 1, secondary shaft 146 extends slightly through end cap 74 and has mounted at end 286 one extremity of actuating reset lever 290. Rotational movement of lever 290 relative to shaft 146 is prevented by splines in shaft 146 and its associated socket in aperture 260 of lever 290. Lever 290 is retained upon shaft by bolt 296 which is threadably received in aperture 298 in shaft 146.

The opposite extremity of actuating reset lever 290 has an integral clevis 300 therein. Reset lever 290 is normally vertical to shaft 146 and is restrained in such position by spring loaded ball 302 which is received in a detent 304 in end cap 74. Clevis 300 rotatably receives reset rod end 306 therein which is attached to reset rod 308. Reset rod 308 has rotary solenoid assist spring 316 thereon and extends through guide notch 310 in flange 312 to reset handle 314 which is rotatably attached to a suitable support on the aircraft seat.

Rotary solenoid 154, energized by expansion of inertial weights of centrifugal actuating mechanism 86, twists secondary shaft 146 in a clockwise direction with the assistance of rotary solenoid assist spring 316, thereby resulting in pawls 144 engaging their respective locking gears 140, thus locking the mechanism, while simultaneous clockwise movement of shaft 146 rotates lever 290 dislodging spring loaded ball 302 from its associated detent 304.

Disengagement of pawls 144 from their gears is accomplished by pulling down on reset handle 314 against the bias load of spring 316, thus drawing lever 290 into its normal vertical position which engenders a counter clockwise movement to shaft 146 and disengaging the pawls from their respective gears, unlocking the mechanism and at the same time resetting ball 302 in detent 304.

Flange 312 has passing therethrough under guide notch 310 one extremity of pneumatic hammer cylinder 320 which houses hammer 322 therein. Cylinder 320 is positioned between flange 312 and reset lever 290 in such manner that an introduction of expanding gases into cylinder 320, hammer 322 is driven against lever 290, dislodging ball 302 from detent 304 with the assistance of spring 316, thus accomplishing locking of the device. Expanding gases are conducted from ballistics retraction cylinder 168 to pneumatic hammer cylinder 320 by a suitable fitting and high pressure line.

Normal operation of the device is initiated by withdrawal of shoulder straps 30 from their associated spools within the device, the withdrawal rotating primary shafts 60 and 62, winding take-up straps 34 upon their corresponding spaces on the shafts.

Take-up straps 34 are shortened as a result of winding upon shafts 60 and 62, thereby drawing spring retaining carriages 232 up spring guides 228 against the bias load imparted by compressing resilient springs 262. Therefore, as the force withdrawing the shoulder straps from their spools diminishes, resilient springs 262 force carriages 232 back down guides 228, unwinding take-up straps 34 from their shafts 60 and 62, thereby counter-rotating the shafts in a direction which results in rewinding shoulder straps 30 upon their associated spools 80. In this manner, if a load is applied to either or both shoulder straps 30 which is greater than the resiliency of springs 262, withdrawal of the straps from their spools is effected. Conversely, as the load upon such strap decreases to a point less than the resiliency of springs 262, the springs, through their association with the take-up straps, causes counter rotation of primary shafts 60 and 62 and their corresponding shoulder strap spools, thus rewinding the straps thereon.

The device of the invention thus permits smooth and unrestricted movement of both sets of straps provided the loads and acceleration applied to the shoulder straps do not impart a rotational speed to the primary shafts which results in a centrifugal force in excess of a set g loading being applied to inertial actuating mechanism 86.

If the acceleration and load applied to the shoulder straps impart a force to either primary shaft sufficient to activate inertial actuating device 86, weights 98 overcome the bias load of retaining springs 136 and are caused to accelerate away from spider 88 until they strike machine screw head portion 128, thereby increasing the diameter of the device. The resulting increase in diameter activates the associated microswitch, closing a circuit and energizing rotary solenoid 154. Rotary solenoid 154, with the assistance of rotary solenoid assist spring 316, subsequently rotates secondary shaft 146 in a clockwise direction, dislodging ball 302 from detent 304 and rotating reset lever 290 into the locked position while simultaneously driving pawls 144 into engagement with ratchet locking gears 142, thereby locking the device and preventing further clockwise movement of the primary shafts or further unwinding of the shoulder straps. As the load decreases to a point less than the bias load of resilient springs 262, the take-up straps cause a counter rotation to the primary shafts, which causes pawls 144 and their associated locking gears 142 to ratchet, thus insuring no clockwise movement of the shafts until the device is manually unlocked. Unlocking must be accomplished manually by pulling reset handle 314 hence reset rod and reset lever into a position which allows spring loaded ball 302 to drop into detent 304 and impart as counter rotational movement to such secondary shaft thereby disengaging pawls 144 from gears 142 thus unlocking the device and permitting normal operation.

Normal operation of the device is initiated by withdrawal of shoulder straps 30 from their associated spools within the device. Such withdrawal unwinds the straps from their associated spools, rotating primary shafts 60 and 62, which cause a take-up of straps 34 on the shafts. This results in drawing spring retaining carriages 232 up spring guides 228.

In the instance where the seat and occupant must be separated from the vehicle, the disclosed device draws the occupant into a position firmly against the seat to prevent injury during the severe acceleration experienced for the first few seconds. This function is accomplished by the invention in the following manner: As the ejection switch is thrown, an electrical impulse ignites explosive charge or squib 202, which generates rapidly expanding gases within ballistics retraction cylinder 168 between cylinder head 196 and piston head 208, rapidly accelerating piston assembly 206 down cylinder 168. This causes cylinder flanges 186 and 188 to drive carriages 232 downwardly, rapidly and forcefully unwinding take-up straps 34 thereby rewinding shoulder straps 30 upon their associated spools and very rapidly drawing the occupant into the desired position.

Pressure from such explosion is allowed to bleed off at a given rate through sized weep hole 214 in cylinder 168.

Simultaneously with piston assembly 206 being driven down cylinder 168, a portion of the rapidly expanding gases is transferred by a high pressure armored line to pneumatic cylinder 320, thus driving hammer 322 and causing it to strike reset lever 290. This blow, with the assistance of rotary solenoid assist spring 316, drives ball 302 from detent 304 while rotating reset lever 290 in such a direction as to impart a clockwise rotation to secondary shaft 146, engaging pawls 144 in locking gears 142. Again, after all gas pressure is bled off, the device must be unlocked manually.

As thus described, the present invention is employed with a suitable safety harness and resides in a safety device operative to restrain the occupant of a seat. It comprises a housing having spool members fixed to coaxial independent main shafts which receive the flexible shoulder strap portions of such harness. Spaces adjacent the spool receive a flexible take-up member, this member being coilable about the shaft against the bias of yieldable resilient spring members which urge rotation of the shafts. In addition, the device comprises a secondary shaft member supporting and having fixed thereon pawl members for engagement with a locking gear member positioned and fixed upon the main shaft. The locking gear members each have a centrifugal actuator adjacent thereto comprising a central member having a plurality of inwardly biased weights such that a specific centrifugal force is required to cause the weights to move radially relative to the primary shaft, hence increasing the over-all diameter of the centrifugal actuator and initiating locking of the device. The present invention incorporates a rotary solenoid operative upon the secondary shaft and effecting a rotation of the secondary shaft in a direction to cause engagement of the pawls with the locking gear. The solenoid is energized by microswitches adjacent to the centrifugal actuator having follower portions which respond to a change in the circumference of the centrifugal actuator.

The device herein disclosed further incorporates a ballistic cylinder having a piston therein suitably attached to an annular collar upon the outer surface of the cylinder, the collar having extensions thereon which contact independent carriage members slideably mounted upon spring guides, the spring members being between the carriages and housing to thereby provide a force tending to return the carriages to their extended position. The secondary shaft has affixed to it a lever which receives a reset arm biased against a resilient member in one direction. This lever has a predetermined normal position relative to the housing and is normally locked in such position so that reset movement of the lever causes the pawl to disengage from the locking gear, thus freeing the straps for additional forward motion.

I claim:
1. A safety device operable to restrain a seat occupant comprising in combination:
   (A) primary biased means receiving and winding a harness, said means rotatably responsive to unwinding force exerted through the harness;
   (B) locking means in cooperative relationship with said biased means operative to prevent further unwinding thereof on the application of a given g load transmitted to said biased means through the harness, said locking means including an actuating means rotatable with said biased means, said actuating means comprising:
      a plurality of inwardly urged inertial weights having a first diameter and responsive to centrifugal force applied by said biased means to assume a second diameter greater than said first diameter, and
      means responsive to said change in diameter operative to lock said biased means against further unwinding rotational movement, and
   (C) means operative to cause automatic retraction of the harness through positive winding of said primary biased means comprising:
      selectably activated high pressure fluid actuated means operative to cause winding rotation of said primary biased means to a full harness retracted position,
      said fluid actuated means locking said primary biased means against unwinding rotation when in the fully retracted position.

2. A safety device operable in conjunction with a body harness wherein the harness is attached on its free end to said safety device, comprising in combination:
   (A) at least one independent first rotatable shaft for receiving and winding the free end of the body harness;
   (B) biasing means cooperative with said first rotatable shaft urging said shaft to rotate in a direction to cause winding of the body harness thereon;
   (C) means for preventing rotation of said first shaft in a body harness unwinding direction comprising:
      (1) centrifugal force responsive means attached to and rotatable with said first rotatable shaft, said means expandable on the application of a preset centrifugal force resultant from rotation of said first shaft,
      (2) means sensing expansion of said centrifugal force responsive means,
      (3) locking means comprising:
         (a) a gear fixed to and rotatable with said first rotatable shaft, and
         (b) independently rotatable pawl means engageable with said gear, said pawl means rotatable toward said gear in response to said sensing means and operable to lock said gear from further rotation in a harness unwinding direction on engagement thereof.

3. A safety device operable in conjunction with a body harness wherein the harness is attached on its free ends to said safety device, comprising in combination:
(A) a plurality of coaxial, independent first rotatable shafts each receiving one free end of the body harness;
(B) means biasing each said first rotatable shaft to rotate in a harness winding direction independently; said means comprising spring biased carriage means coupled to said first rotatable shaft, said spring biased carriage means continuously urging said shaft to rotation in a harness winding direction,
(C) means cooperative with said first rotatable shafts and rotatable therewith, said means comprising: centrifugal force responsive means having a first diameter operative to assume a second diameter responsive to centrifugal force in excess of a preselected g loading resultant from rotation of said first rotatable shafts,
(D) means sensing change in diameter of said centrifugal force responsive means, means responsive to and actuated by said sensing means locking each said first rotatable shaft to prevent further rotation thereof.

4. A device as defined in claim 3 including:
actuatable retraction means comprising:
a cylinder substantially coextensive with said biasing means,
a piston operable in conjunction with said cylinder and having means cooperative with said spring biased carriage means operable to cause each said coaxial independent first rotatable shaft to rotate in a harness winding direction on actuation of movement of said piston.

5. A safety harness operable in conjunction with a body harness, comprising in combination:
(A) a housing member defining an enclosure having means thereon for mounting said housing to an associated structure;
(B) at least one primary shaft journaled in and extending between walls of said housing, said shaft having the ends of an associated body harness member secured thereto operative to wind and unwind said harness ends;
(1) centrifugal actuating means attached to and rotatable with said primary shaft, said means comprising:
(a) a spider affixed to said shaft, said spider having a plurality of means thereon operative to guide and seat inertial weight members,
(b) a plurality of weight members radially movably attached to said spider, each said member defining at least a segment of a circle at the outer portion thereof and having at least one aligned, coaxial bore extending radially therethrough, said bore being larger at the outer circumference of said weight and defining a shoulder on the interior of said bore,
(c) removably attached adjustable guide means in cooperative relationship to said spider and weight member, said means extended through said bores and removably attached to said spider, biasing means in cooperative association with said guide means and said shoulder operative to retain said weight member in a seated position until the bias exerted thereby is overcome by centrifugal forces operating on said weights,
(d) signal generating means responsive to a change in diameter of said weight members occasioned by outward radial movement thereof,
(2) at least one gear attached to said primary shaft and rotatable therewith, said gear having teeth the points of which are oriented in the direction of unwinding rotation and cooperative with locking means to prevent further unwinding rotation,
(C) at least one secondary shaft coextensive with said primary shaft and independently rotatable therewith;
(1) secondary shaft rotation imparting means cooperative with said secondary shaft and responsive to signals resultant from said signal generating means,
(2) at least one pawl fixed to said secondary shaft and rotatable therewith operative to engage said gear teeth to mechanically lock said first shaft against unwinding rotation,
(D) at least one spring biased means extended from said housing, said means having a carriage member attached to the end thereof furthest removed from said housing:
(1) said carriage movable toward said housing against the bias exerted by said spring biasing means through action of the harness member in unwinding, and away from said housing in response to the extension of said spring biasing means on relaxation of harness tension, and
(E) means selectively operative to disengage said pawl from said gear tooth to permit further unwinding rotation of said first shaft.

6. The device as defined in claim 5, including in addition:
(A) a cylinder in cooperative coextensive relationship to said spring biased means, said cylinder selectively closed on one end;
(B) a piston assembly slideably received within said cylinder and frictionally retained therein in the portion thereof in closest relationship with said housing;
(1) said piston assembly having at least one member extending therefrom through the wall of said cylinder,
(2) said member engageable with said movable carriage and operative to carry said carriage with it away from said housing on activation of a force generating means operative against said piston to assure rapid, positive retraction of the harness through winding rotation of said primary shaft.

References Cited

UNITED STATES PATENTS

| | | | |
|---|---|---|---|
| 2,791,397 | 5/1957 | Coffman | 242—107.4 X |
| 3,077,324 | 2/1963 | Strickland | 242—107.4 X |
| 3,105,662 | 10/1963 | Wrighton | 242—107.4 X |
| 3,190,579 | 6/1965 | Spouge et al. | 242—107.4 |
| 3,206,137 | 9/1965 | Snyderman | 242—107.4 |
| 3,220,668 | 11/1965 | Martin | 242—107.4 |
| 3,248,069 | 4/1966 | Nichols | 242—107.4 |

FRANK J. COHEN, *Primary Examiner.*

W. S. BURDEN, *Examiner.*